US009036991B2

(12) United States Patent
Aguren

(10) Patent No.: US 9,036,991 B2
(45) Date of Patent: May 19, 2015

(54) OPTICAL TRANSCEIVER HAVING AN OTDR MODE, AND A METHOD OF OBTAINING TEST DATA FOR TESTING AN OPTICAL FIBER

(75) Inventor: Jerry G. Aguren, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 13/259,833

(22) PCT Filed: Oct. 30, 2009

(86) PCT No.: PCT/US2009/062709
§ 371 (c)(1),
(2), (4) Date: Sep. 23, 2011

(87) PCT Pub. No.: WO2011/053306
PCT Pub. Date: May 5, 2011

(65) Prior Publication Data
US 2012/0020672 A1  Jan. 26, 2012

(51) Int. Cl.
H04B 17/00 (2006.01)
H04B 10/071 (2013.01)
G01M 11/00 (2006.01)

(52) U.S. Cl.
CPC ......... *H04B 10/071* (2013.01); *G01M 11/3154* (2013.01)

(58) Field of Classification Search
CPC ..................... H04B 10/071; H04B 10/073
USPC .......................................................... 398/33
See application file for complete search history.

(56) References Cited

U.S. PATENT DOCUMENTS

| 6,301,036 | B1 * | 10/2001 | Spencer ......................... 398/31 |
| 6,549,310 | B1 | 4/2003 | Kuchta et al. |
| 7,341,384 | B2 * | 3/2008 | Chan et al. ...................... 385/89 |
| 7,388,657 | B2 * | 6/2008 | Abbott .......................... 356/73.1 |
| 7,393,145 | B1 | 7/2008 | Stevens |
| 7,484,899 | B2 | 2/2009 | Chan |
| 7,493,040 | B1 * | 2/2009 | Schofield et al. .............. 398/40 |
| 7,684,699 | B2 * | 3/2010 | Schmuck et al. .............. 398/33 |
| 7,793,040 | B2 * | 9/2010 | Bittner, Jr. .................... 711/108 |
| 8,290,364 | B2 * | 10/2012 | Yang .............................. 398/20 |

(Continued)

FOREIGN PATENT DOCUMENTS

EP    1763158    3/2007

OTHER PUBLICATIONS

International Search Report and Written Opinion, dated Jul. 9, 2010, 9 pages.
Mulder,et.al,"A Novel Technique for Low-Cost Embedded Non-intrusive Fiber Monitoring of P2MP Optical Access Networks", OFC/NFOEC 2007, Mar. 2007, 3 pages.

(Continued)

*Primary Examiner* — Ken Vanderpuye
*Assistant Examiner* — Amritbir Sandhu
(74) *Attorney, Agent, or Firm* — Hewlett-Packard Patent Department

(57) ABSTRACT

An optical transceiver has a communications mode and an optical time domain reflectometer (OTDR) mode. The transceiver comprises a transmitter channel and a receiver channel operable, in the communications mode, to respectively transmit and receive communications signals through respective external optical fibers. The transceiver also comprises a guide arrangement for guiding, in the OTDR mode, a reflected OTDR signal along a path from the transmitter channel into the receiver channel. A method of obtaining test data for an optical fiber in an optical data communications subsystem is also disclosed.

18 Claims, 8 Drawing Sheets

(56) References Cited

U.S. PATENT DOCUMENTS

| | | | |
|---|---|---|---|
| 8,311,372 B2 | 11/2012 | Anderson et al. | |
| 8,634,713 B2 * | 1/2014 | Campanelli et al. | 398/10 |
| 2004/0047629 A1 * | 3/2004 | Evangelides et al. | 398/33 |
| 2006/0029390 A1 * | 2/2006 | Schmuck et al. | 398/33 |
| 2006/0228078 A1 | 10/2006 | Chan et al. | |
| 2007/0036545 A1 * | 2/2007 | Lautenschlager | 398/33 |
| 2007/0206203 A1 * | 9/2007 | Trainer | 356/521 |
| 2008/0101752 A1 | 5/2008 | Chan et al. | |
| 2008/0231842 A1 * | 9/2008 | Brendel | 356/73.1 |
| 2008/0309925 A1 * | 12/2008 | Abbott | 356/73.1 |
| 2009/0097851 A1 * | 4/2009 | Tan et al. | 398/82 |
| 2011/0255860 A1 * | 10/2011 | Lee et al. | 398/12 |
| 2012/0020672 A1 * | 1/2012 | Agueren | 398/139 |
| 2012/0163800 A1 | 6/2012 | Urban | 398/12 |
| 2014/0226158 A1 * | 8/2014 | Trainer | 356/336 |

OTHER PUBLICATIONS

Keeler, et.al, In situ OTDR for low-cost optical networks using singlemode 850nm VCSEL, Electronics Letters Jul. 7, 2005 vol. 41 No. 14, 2 pages.

Kuznia, Charlie, "Integration of Fiber Optic Cable Diagnostics Within Aerospace Transceivers", Avionics Fiber-Optics and Photonics, 2006, IEEE Conference, 2 pages.

Mulder, et.al. "Embedded OTDR Monitoring of the Fiber Plant behind the PON Power Splitter", Proceedings Symposium IEEE/LEOS Benelux Chapter, 2006, Eindhoven, 4 pages.

Chan, et.al, A Novel Gb/s Transceiver with OTDR Built-in-test (BIT) for Health Monitoring of Local Area Networks, OFC/NFOEC 2007, 3 pages.

* cited by examiner

US 9,036,991 B2

OPTICAL TRANSCEIVER HAVING AN OTDR MODE, AND A METHOD OF OBTAINING TEST DATA FOR TESTING AN OPTICAL FIBER

TECHNICAL FIELD

The invention relates generally to the field of optical transceivers.

BACKGROUND

It is known to use an optical time-domain reflectometer (OTDR) in the form of a standalone optoelectronic test instrument to characterize an optical fiber. The OTDR injects a series of optical pulses into an optical fiber under test, and detects light that is Rayleigh scattered and reflected back from locations in the fiber where the fiber's index of refraction changes. The return pulses are, for example, measured and integrated as a function of time, and can be plotted as a function of fiber length. Such an OTDR may be used for estimating a fiber's length and overall attenuation, including indicating splice and connection losses, for example. The OTDR can also be used to locate faults, such as breaks, in the fiber. It is also known to provide small form factor fiber-optic transceiver modules having built-in test capability.

SUMMARY

In accordance with the invention, there is provided an optical transceiver as claimed in claim 1.

In accordance with a further aspect of the invention, there is provided a method of obtaining test data for an optical fiber as claimed in claim 9.

BRIEF DESCRIPTION OF THE DRAWINGS

In order that the invention may be well understood, various embodiments thereof will now be described, by way of example only, with reference to the accompanying drawings, in which.

Drawings are schematic and not to scale.

DETAILED DESCRIPTION

Figure 1:
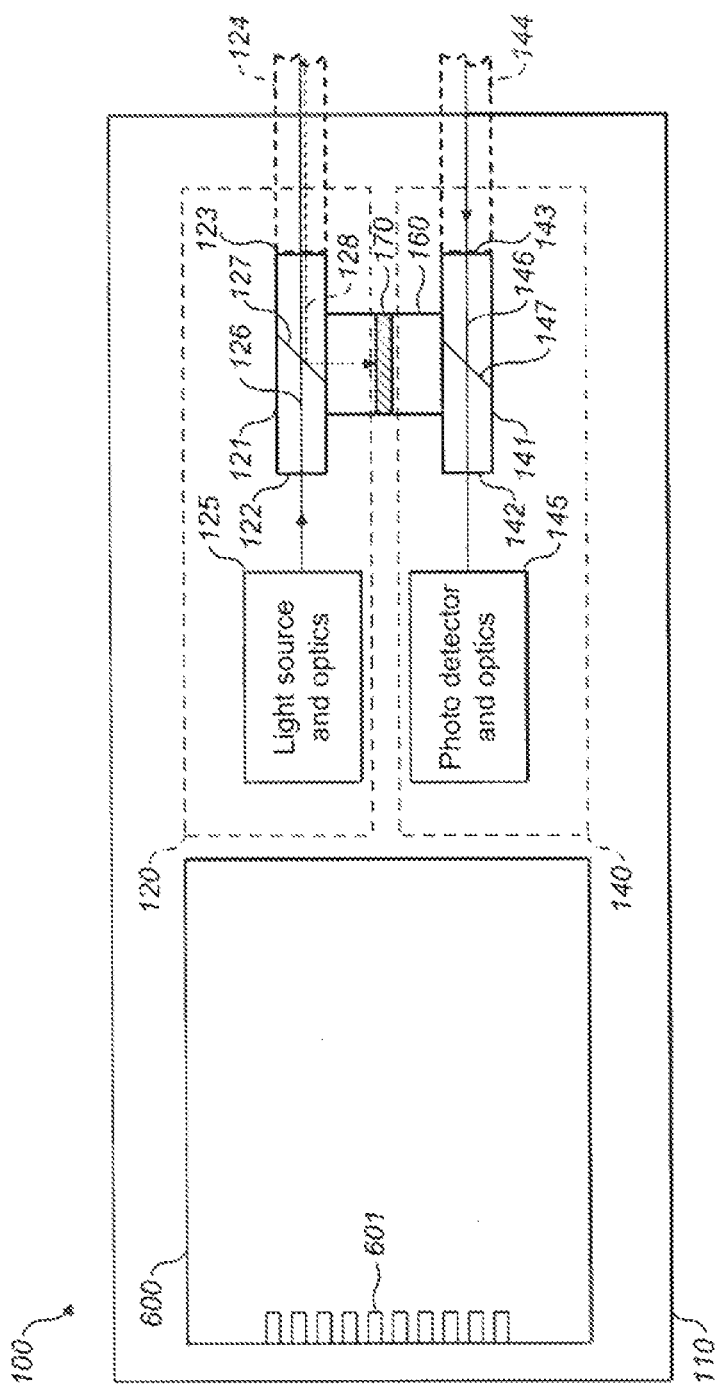
FIG. 1 is a schematic plan view illustrating selected features of an optical transceiver in a communications mode.
Figure 2:
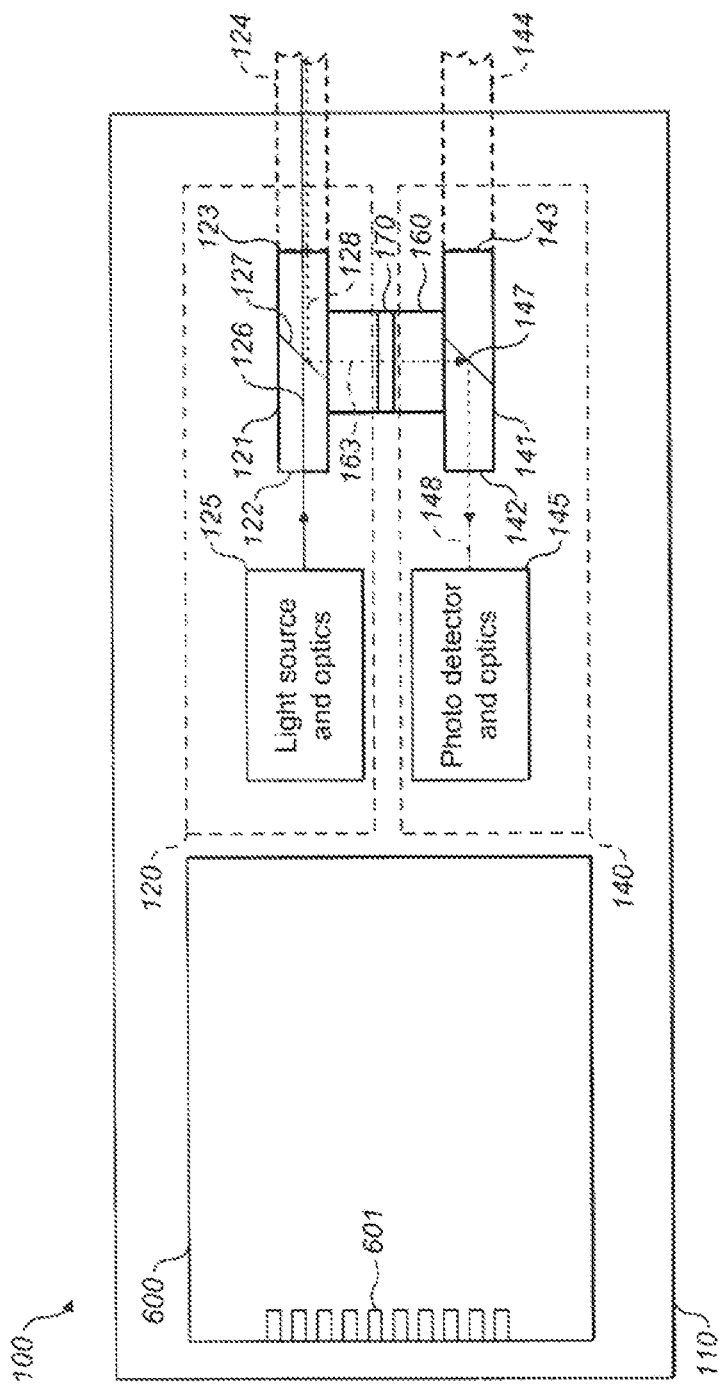
FIG. 2 is a schematic plan view illustrating selected features of the optical transceiver in an optical time domain reflectometer (OTDR) mode.
Figure 3:
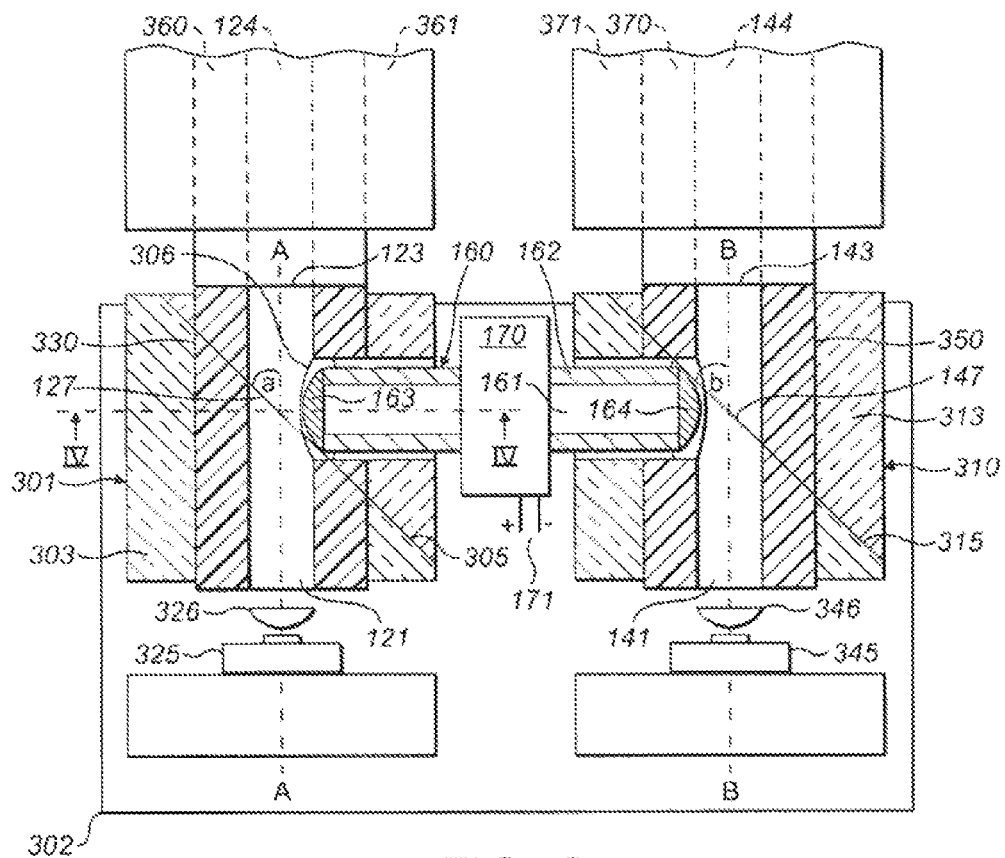
FIG. 3 is a plan view in partial cross-section showing further details of the construction of one embodiment of the optical transceiver.

FIGS. 1 to 3 illustrate selected aspects of an optical transceiver 100 having a body 110 supporting a transmitter arrangement indicated for convenience by the bounds of broken line 120, a receiver arrangement indicated for convenience by the bounds of broken line 140, and electronic circuitry 600 operable to control the transmitter and receiver arrangements 120, 140. The electronic circuitry 600 includes electrically conductive contacts 601 for connecting with a compatible circuit (not shown) of a host device (not shown), to enable the host device, in a communications mode of the transceiver 100, to use electrical signals to cause optical communications signals to be transmitted and received by the transmission and receiver arrangements 120, 140. The transceiver 100 also has an OTDR mode in which the electronic circuitry 600 causes the transmitter arrangement 120 to transmit an OTDR signal, the back-scattered radiation from which is received by the receiver arrangement 140.

The transmitter arrangement 120 includes a transmitter channel 121 having a generally planar end face 122 and an axially opposite generally planar end face 123 for mating with a generally planar end face of an external optical fiber 124. The transmitter channel 121 comprises, for example, silicon dioxide (silica) or other material suitable for allowing propagation of optical signals, and has a generally circular cross-section surrounded by cladding (330, FIG. 3) to facilitate total internal reflection. The transmitter channel 121 also includes a light source and optics arrangement 125 for generating optical signals and injecting the optical signals into the planar end face 122 of the transmitter channel 121. The light source conveniently comprises a laser, for example a semiconductor laser diode (325, FIG. 3) such as a vertical cavity surface emitting laser (VCSEL), and the optics conveniently comprises one or more lenses (326, FIG. 3).

The receiver arrangement 140 includes a receiver channel 141 having a generally planar end face 143 for mating with a generally planar end face of an external optical fiber 144, and an axially opposite generally planar end face 142. The receiver channel 141 can also comprise, for example, silicon dioxide or other material suitable for allowing propagation of optical signals, and has a generally circular cross-section surrounded by cladding (350, FIG. 3) to facilitate total internal reflection. The receiver arrangement 140 also includes a photodetector and optics arrangement 145 for receiving optical signals from the receiver channel 141 and converting the optical signals to electrical signals. The photodetector (345, FIG. 3) conveniently comprises an avalanche diode configured to operate close to avalanche mode, although for some embodiments alternative photodetectors may be appropriate, for example a p-i-n diode photodetector. The receiver optics conveniently comprises one or more lenses (346, FIG. 3). The laser diode 325 and photodetector 345 are operable to respectively generate and detect optical signals having mutually similar wavelength, for example in the region of 850 nm or any other suitable wavelength.

The transmitter channel 121 and the receiver channel 141 include respective first and second beam splitters 127, 147. The transceiver 100 further includes a lateral guide 160 extending laterally of the respective longitudinal axes of the transmitter and receiver channels 121, 141 adjacent the longitudinal locations of the beam splitters 127, 147. The lateral guide 160 includes a lateral guide channel 161 (FIG. 3) having a generally circular cross-section and comprising, for example, silicon dioxide. The lateral guide channel 161 is provided with radially outer cladding 162 to facilitate propagation of guided optical signals along the guide channel 161. The lateral guide 160 also conveniently includes, at opposite longitudinal end portions thereof, respective plano-convex lenses 163, 164 for guiding optical signals between the transmission and receiver channels 121, 141 and the lateral guide channel 161.

The transceiver 100 is also provided with a shutter arrangement including an optical shutter 170 having an electrical connection to the circuitry 600. The optical shutter 170 is arranged laterally across the longitudinal axis of the lateral guide channel 161. The optical shutter 170 is controllable through the electrical connection 171 by the circuitry 600 to assume at least two conditions. In one, open, condition of the optical shutter 170, propagation of optical signals along the lateral guide channel 161 is permitted, at least for wavelengths in the region of the transmission wavelength. In an alternative, shuttered, condition of the optical shutter 170, propagation of optical signals along the lateral guide channel 161 is significantly reduced or prevented, at least for wavelengths in the region of the transmission wavelength. The optical shutter 170 can take the form of an optical modulator, for example a liquid-crystal light valve, or any other appropriate shutter device with sufficiently fast switching capability.

The first beam splitter 127 of the transmitter channel 121 includes mutually oppositely facing substantially planar adjacent faces extending laterally across the transmitter channel 121, and is disposed in a vertical plane at a precisely determined angle with respect to the longitudinal centre axis A-A of the transmitter channel 121. The angle a (FIG. 3), is defined as the smallest angle, measured in a horizontal plane, between the vertical plane of the first beam splitter 127 and a vertical plane including the centre axis A-A of the transmitter channel 121. A suitable material may be disposed between the adjacent faces, for example as a coating on at least one of the faces, to obtain desired transmission characteristics through the first beam splitter 127. For example, the coating, if present, could determine what proportion of a signal passes along the transmitter channel 121, and what proportion is reflected.

The second beam splitter 147 of the receiver channel 141 includes mutually oppositely facing substantially planar adjacent faces extending laterally across the receiver channel 141, and is disposed in a vertical plane at a precisely determined angle with respect to the longitudinal centre axis B-B of the transmitter channel 121. The angle b (FIG. 3), is defined as the smallest angle, measured in a horizontal plane, between the vertical plane of the second beam splitter 147 and a vertical plane including the centre axis B-B of the receiver channel 141. A suitable material may be disposed between the adjacent faces, for example as a coating on at least one of the faces, to obtain desired transmission characteristics through the second beam splitter 147. For example, the coating, if present, could determine what proportion of a signal passes through the second beam splitter 147, and what proportion is reflected.

As illustrated in FIG. 1, in the communications mode, the transceiver 100 is operable to transmit outbound signals along a transmission path shown by unbroken line 126 through the transmitter channel 121 into the external optical fiber 124, and to receive incoming signals along a received signal path 146. The first beam splitter 127 in the transmitter channel 121 permits transmission therethrough along the path 126 of a proportion of the energy of an outbound signal. Some proportion of the outbound signal will be reflected from the path 126 by the first beam splitter 127 and dispersed. The second beam splitter 147 is configured to permit passage therethrough along the received signal path 146 of some proportion of the energy of an incoming signal. Some proportion of the incoming signal will be reflected from the path 146 by the second beam splitter 147 and dispersed.

Outbound signals along the path 126 cause back-scattered radiation to be reflected along a return path, indicated generally by broken line 128, in an opposite direction to the outbound signal. The angle a of the first beam splitter 127 is configured to reflect a proportion of the back-scattered signal laterally of the longitudinal centre axis A-A through the guide channel 161, towards the second beam splitter 147 in the receiver channel 141. In the communications mode, the optical shutter 170 is in the shuttered condition and reduces or prevents passage of signals laterally through the guide channel 161 into the receiver channel 141.

As illustrated in FIG. 2, in the OTDR mode, the transceiver 100 is operable to transmit an outbound OTDR signal along the path 126, for example in the form of a predetermined optical pulse. The resultant back-scatter of the reflected OTDR signal is reflected along the return path 128, and a proportion of this back-scatter is further reflected by the first beam splitter 127 into the lateral guide channel 161. In the OTDR mode, the optical shutter 170 is in a condition to permit propagation of the resultant back-scatter of the reflected OTDR signal through the lateral guide channel 161, along a path indicated generally by the reference 163, to the second beam splitter 147 in the receiver channel 141. The angle b of the second beam splitter 147 is configured to reflect a proportion of the back-scatter received from the lateral guide channel 161 along path 148 to the receiver optics and photodetector 145. In FIGS. 1 to 3, the first beam splitter 127 is configured to reflect back-scattered signals laterally at about 90° to the longitudinal centre axis A-A. However, in alternative embodiments, any convenient alternative angle can be selected, and the second beam splitter 147 and lateral guide 160 reconfigured accordingly. From the above description, it will be apparent that a guide arrangement is provided for guiding, in the OTDR mode, a reflected OTDR signal along a path from the transmitter channel into the receiver channel. To facilitate detection of back-scatter from the reflected OTDR signal, the electronic circuitry 600 causes transmission of communication signals through the receiver channel 141 along the path 146 to cease in OTDR mode, as described in further detail below.

Figures 4, 5:
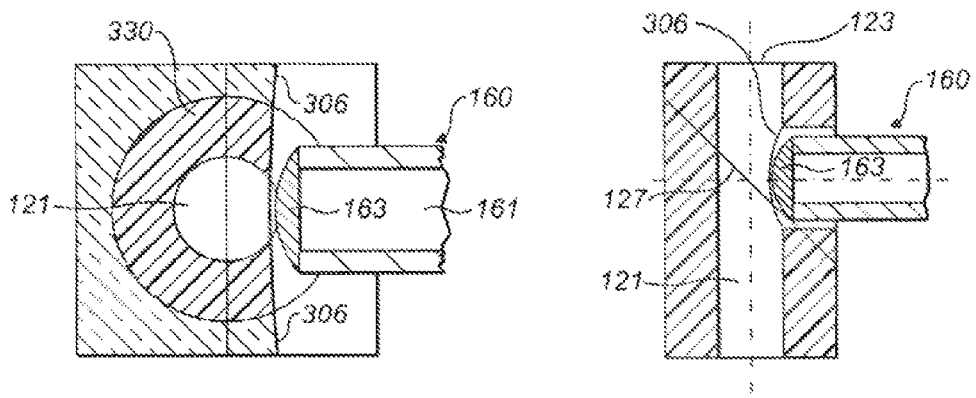
FIG. 4 is an end view taken on section IV-IV in FIG. 3.
FIG. 5 is a plan view showing a detail of a portion of a guide arrangement shown in FIG. 3.

One exemplary construction and arrangement of the lateral guide 160 and the transmitter and receiver channels 121, 141 will now be described mainly with reference to FIGS. 3 to 5. FIG. 3 is a plan view of portions of the optical transceiver 100 in partial cross-section through a horizontal plane including the longitudinal centre axes A-A and B-B of the transmission and receiver channels 121, 141. FIG. 3 shows the ends of two external optical fibers 124, 144 with cladding 360, 370 protruding from respective ferrules 361, 371 of a cable end connector, for example an LC connector or any other appropriate type of connector. The protruding ends are receivable in recesses of the transceiver 100, such that respective end faces of the external optical fibers 124, 144 are biased into face-to-face abutment with the respective generally planar end faces 123, 143 of the transmitter channel 121 and the receiver channel 141. The transmitter channel 121 and the receiver channel 141 respectively form part of a transmitter subassembly 301 and a receiver subassembly 310. The transmitter light source and optics 325, 326 and the receiver photodetector and optics 345, 346 respectively form part of the transmitter subassembly 301 and the receiver subassembly 310, and are mounted in respective alignment with the transmitter and receiver channels 121, 141. Components of the transmitter and receiver subassemblies 301, 310 and the lateral guide 160 are fixedly mounted in alignment relative to one another, for example by fixed mounting to a common rigid support 302.

In one exemplary embodiment, a short length of an optical fiber with cladding, such as 50 μm/125 μm 0M3 optical fiber, is encased at least partially around the radially outer periphery of the cladding with a plastics material to form a body 303, 313. At least one of the base and sides of the plastics body is flat and manufactured to predetermined tolerances, to facilitate alignment relative to the common support 302 and/or another subassembly 301, 310. A cut 305, 315 is made at a desired angle a, b to the optical fiber's longitudinal axis, vertically through the plastics body and the optical fiber. The two resultant halves are mated together in mutual alignment, for example by adhering opposite portions of the plastics together. The resulting mating internal end faces of the optical fiber provide a first beam splitter 127, and a second beam splitter 147.

Subsequently, a vertical incision 306, 316 is made laterally partially through the plastics body 303, 313, cladding 330, 350, and optical fiber 121, 141 in the region of the first beam splitter 127, and a second beam splitter 147 using a circular rotating cutting tool having a cutting edge with a curved edge profile. The vertical incision 306, 316 provides a passage into which an end of the lateral guide 160 can pass, and exposes the optical fiber core so that a plano-convex lens 163, 164 of the lateral guide 160 can form an optical connection with the transmission or receiver channel 121, 141. The incision 306, 316 is made at a precise longitudinal location of the optical fiber relative to the first beam splitter 127, 147 such that, when the lateral guide 160 is inserted in the incision 306, 316, the longitudinal centre axis of the lateral guide channel 161 is generally aligned with the centre of the first beam splitter 127, and a second beam splitter 147, as best seen in FIG. 5.

Figure 6:
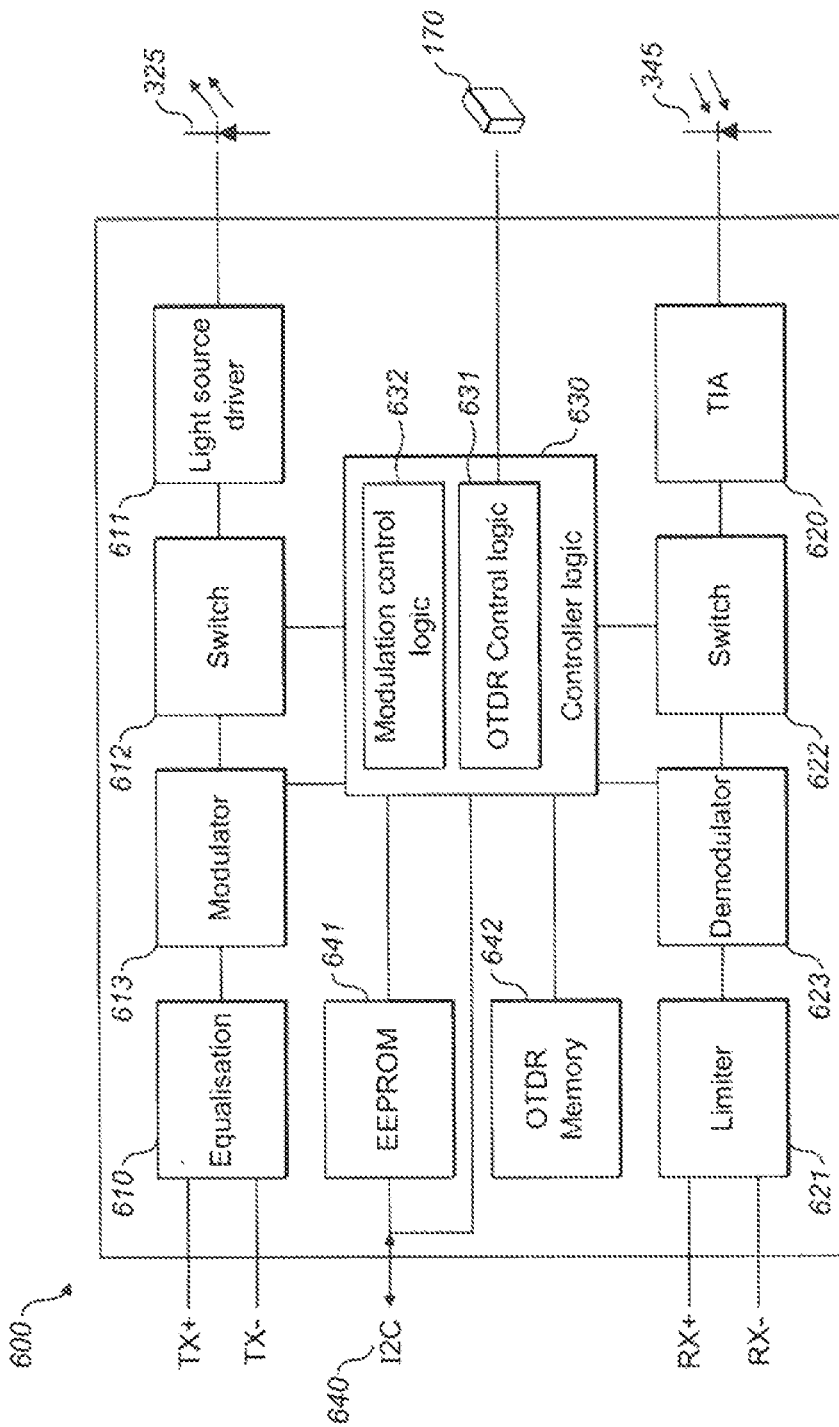
FIG. 6 is a functional diagram illustrating electronic circuitry of the optical transceiver.

Various functions and operations of the electronic circuitry 600 will now be described with reference to FIG. 6. In the communications mode, the electronic circuitry 600 receives host device electrical control signals which are processed through a transmitter electrical signal processing channel including an equalizer 610 and a light source driver 611, for example a laser driver, to cause the laser 325 to transmit optical signals through the transmitter channel 121. The electronic circuitry 600 also receives electrical signals from the photodetector 345 which, in the communications mode, are processed through a receiver electrical signal processing channel including a transimpedance amplifier (TIA) 620 and a limiter 621 for output to the host device. The electronic circuitry 600 comprises control logic 630 including OTDR control logic 631. The control logic 630 can communicate with control logic 630 of another transceiver 100 at an opposite end of an external optical fiber connected to the transmitter channel 121 using a modulator 613 and demodulator 623. The modulator 613 is controlled by modulation control logic 632 to provide transmitter channel sideband communications, modulated over a much lower frequency than the primary communications signal frequency. A demodulator 623 is controlled by the modulation control logic 632 to receive modulated sideband communications from the other transceiver 100.

Conveniently, the transceiver 100 is an SFP-type transceiver, that is, is in conformity with the requirements set out by the SFF committee in various documents for SFP, SFP+, SFF or similar transceivers (example SFF specification documents: INF-8074i, SFF-8431). In alternative embodiments, any other suitable type of optical transceiver can be employed, for example other transceivers with relatively small form factors such as XFP type transceivers and others. In some embodiments, the transceiver 100 is configured to be removably hot pluggable into connection with a host device circuit. The electronic circuitry 600 may be provided in any convenient form. For example, all or parts of the circuitry 600 can comprise hardware logic in the form of an integrated circuit and/or programmable logic such as a field programmable gate array. The circuitry 600 may comprise a printed circuit board interconnecting various discrete components. The circuitry 600 may comprise an embedded computer system with program instructions stored in memory.

The control logic 630 can communicate with a host device ASIC in any suitable manner, for example through a suitable communications interface 640, such as I2C or other suitable interface. For example, the control logic 630 can store data in predetermined locations in a memory 641, for example EEPROM or other suitable memory, and the host device can access the data by polling the memory 641 over the interface 640. In the exemplary embodiment of the SFP-type transceiver 100, the SFP-type diagnostic and monitoring interface can be used for communication with the host device, by using available fields to extend the protocol.

After entering the OTDR mode of the transceiver 100, the OTDR control logic 631 operates a switch 612 to prevent the normal flow of the host device electrical control signals through the transmitter electrical signal processing channel to the laser 325, and operates a switch 622 to prevent the normal flow of electrical signals through the receiver electrical signal processing channel to the host device. Conveniently, the OTDR control logic 631 communicates with the host device to coordinate control of the switches 612, 622.

The OTDR control logic 631 issues signals to the optical shutter 170 through the connection 171 to cause the shutter to open to permit propagation of back-scatter through the lateral guide channel 161. The OTDR control logic 631 controls the light source driver 611 to generate an OTDR test signal, for example an OTDR pulse, that travels into the transmitter channel 121 and the corresponding connected external optical fiber 124. The OTDR test signal generates a reflected OTDR signal, in the form of back-scatter generated by reflection of the test signal by the material of the optical fiber 124 as the test signal travels along the optical fiber 124. The reflected OTDR signal travels back along the transmitter channel 121 in the direction of the path 128 towards the first beam splitter 127. The reflected OTDR signal is guided along a path 128, 163, 148 from the transmitter channel 121 into the receiver channel 141 to the photodetector and optics 145 by the guide arrangement comprising the first beam splitter 127, the lateral guide channel 161 and the second beam splitter 147. Part of the energy of the reflected OTDR signal is redirected from the path at the beam splitters 127, 147, and dispersed. The portion of the reflected OTDR signal guided to the photodetector 345 is detected over a predetermined time period relative to generation of the OTDR pulse, and is converted to electrical signals which are processed by the TIA 620. The OTDR logic 631 samples the signals and stores the resulting OTDR data in memory. A dedicated OTDR memory 642, for example nonvolatile memory such as RAM, or any other suitable memory type, may be provided for storing the OTDR data.

The stored OTDR data can be processed and analysed in accordance with known OTDR processes. For example, the detected OTDR pulse response can be processed to identify anomalies in the external fiber-optic cable, and the approximate distance of such anomalies from the transceiver 100. The OTDR control logic 631 may include OTDR data processing logic for performing some analysis of the OTDR data. Alternatively, the OTDR data can be communicated by the OTDR control logic 631 to the host device using, for example, the I2C interface 640, and some or all of the processing and analysis of the OTDR data can be performed off-transceiver.

Figure 7:
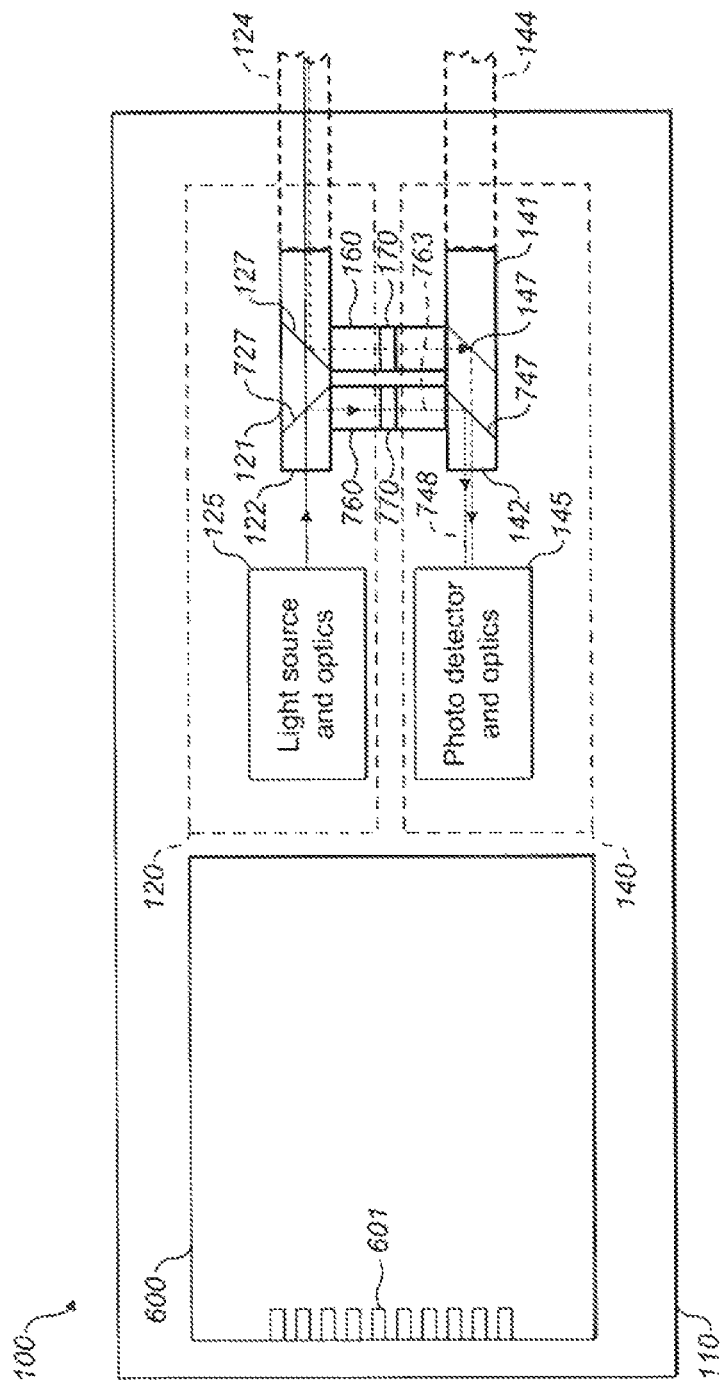
FIG. 7 is a schematic plan view illustrating an alternative embodiment of the optical transceiver.

FIG. 7 shows an alternative embodiment of the transceiver 100, in OTDR mode, in which additional first beam splitter 727, and additional second beam splitter 747 are respectively provided in the transmitter and receiver channels 121, 141. The first beam splitter 727 in the transmitter channel 121 is angled oppositely to the first beam splitter 127, so as to direct the OTDR test signal laterally of the longitudinal axis A-A of the transmitter channel 121 towards the additional first beam splitter 747 in the receiver Channel 141. A lateral light guide 760 is provided to guide the test signal from the additional first beam splitter 727 to the additional second beam splitter 747 along a lateral path indicated by the dotted line 763. The OTDR test signal is further reflected by the additional second beam splitter 747 into the receiver channel 141 and towards the photodetector and optics 145. Some proportion of the energy of the OTDR test signal is reflected away from the path 763, 748 at the respective additional first and second beam splitters 727, 747. A further shutter arrangement 770 is arranged laterally of the longitudinal axis of the lateral guide 760. The respective additional first and second beam splitters 727, 747, the further lateral guide 760 and the further shutter arrangement 770 can be formed in corresponding manner to the previously described first and second beam splitters 127, 147, lateral guide 160 and shutter arrangement 170. Using the embodiment of FIG. 7, the OTDR control logic 631 can conveniently time and record detection of the reflected OTDR signals relative to the original OTDR test signal.

In operation of the transceiver 100 described above with reference to FIGS. 1 to 7, to facilitate detection of back-scatter from the reflected OTDR signal, the electronic circuitry 600 causes transmission of communication signals through the receiver channel 141 along the path 146 to cease in OTDR mode. Additionally or alternatively, the control logic may operate to determine that transmissions from an opposite end of an optical fiber received in the receiver channel 141 have failed. In response to such a determination, for example, the control logic may enter OTDR mode without any requirement to cause the cessation of communication signals through the receiver channel 141 along the path 146.

Figure 8:
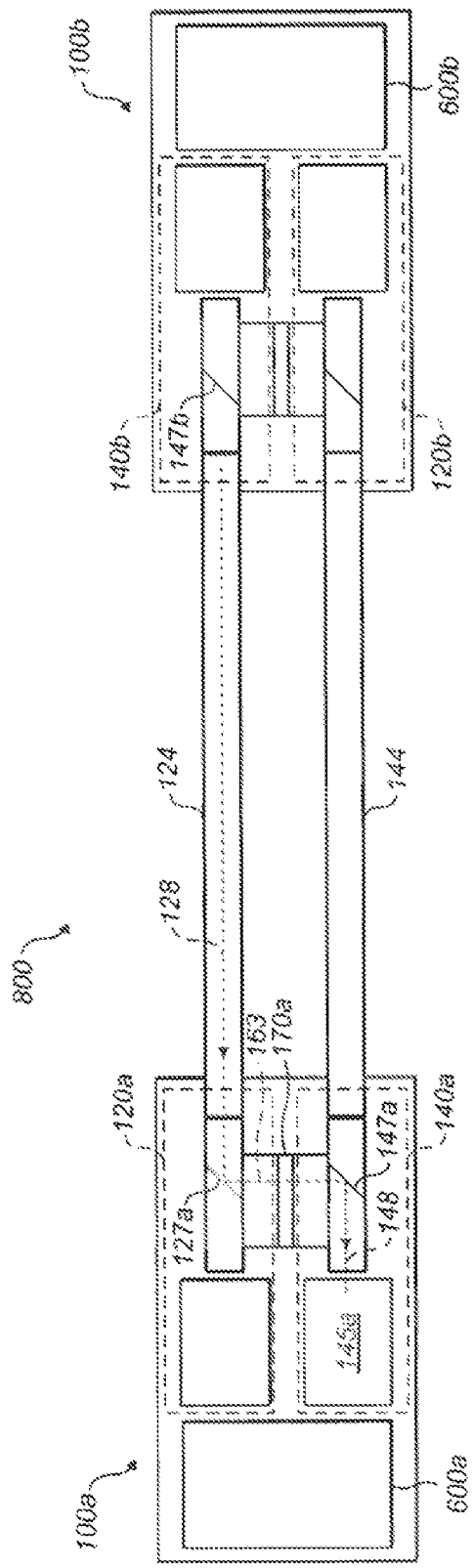
FIG. 8 is a plan view illustrating an optical communications subsystem comprising the optical transceiver.

FIG. 8 is a plan view illustrating an optical data communications subsystem 800 comprising a first optical transceiver 100b having a first transmitter arrangement 120b and a first receiver arrangement 140b connected by respective optical fibers 124, 144 to a second receiver arrangement 140a and a second transmitter arrangement 120a of a second transceiver 100a. Components of the subsystem shown in FIG. 8 having a reference including an appended letter can, for example, correspond to components having a like reference without the appended letter described above with reference to FIGS. 1 to 7.

Figure 9:
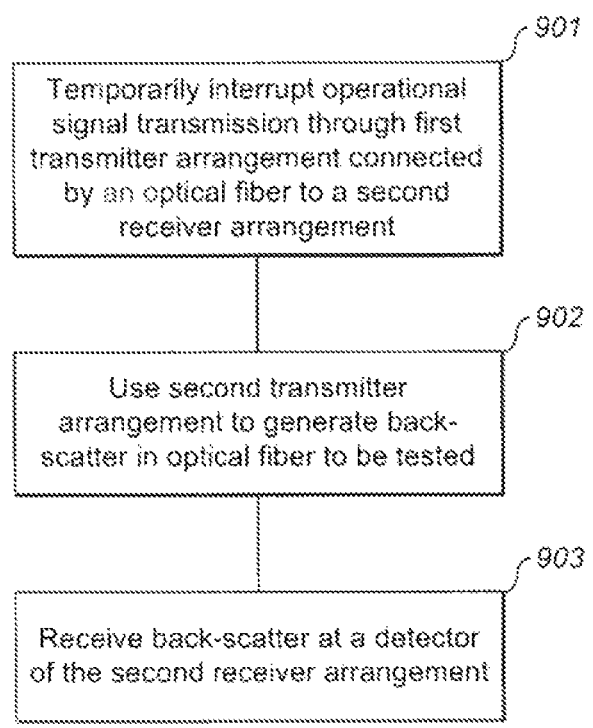
FIG. 9 is a flow diagram illustrating a method of obtaining test data for an optical fiber.

The OTDR control logic 631 may be configured, for example, to place the transceiver 100 in OTDR mode and obtain and store the OTDR test data according to a predetermined schedule and/or in response to communications received from the host device, for example over the I2C interface 640. In one method of obtaining OTDR test data for an optical fiber 124 in the optical data communications subsystem 800, the OTDR control logic of the circuitry 600a, with the transceiver 100a in the communications mode, uses modulated sideband communications to request the OTDR control logic of the circuitry 600b to temporarily interrupt operational signal transmission through the first transmitter arrangement 120b (step 901, FIG. 9). The OTDR control logic of the circuitry 600a then places the transceiver 100a into OTDR mode. The optical shutter 170a is caused to permit propagation of signals therethrough, and an OTDR test signal is transmitted using the second transmitter arrangement 120a to generate back-scatter in the optical fiber 124 to be tested (step 902, FIG. 9). The back-scatter from the optical fiber 124 is guided along the path 128, 163, 148 by the beam splitters 127a, 147a and received at the detector 145b of the second receiver arrangement 140a (step 903, FIG. 9).

The OTDR control logic of the circuitry 600a stores the resultant OTDR data, causes the optical shutter 170a to close, and returns the transceiver 100a to the communications mode. The OTDR control logic of the circuitry 600a may then, using modulated sideband communications, instruct the OTDR control logic of the circuitry 600b to recommence operational signal transmission in the communications mode. Alternatively, such an instruction may not be required, for example where the first transceiver 100b is instructed to temporarily interrupt operational signal transmission for a predetermined time period, causing the transceiver 100b coupled to the opposite end of the external optical fiber 124, to stop transmission of communications signals to the second receiver arrangement 140a facilitates accurate detection of the back-scatter from the OTDR test signal using the photodetector 145a of the second receiver arrangement 140a.

Following detection of a failure in normal operational signalling in the communications mode, or of a failure in modulated sideband communications, prior to performing OTDR testing on the transceiver 100a, the OTDR control logic of the circuitry 600a may communicate with the OTDR control logic of the circuitry 600b through a network connected to the host devices respectively hosting the first and second transceivers 100b, 100a to interrupt the first transmitter arrangement 120b. Such communications between the transceiver 100 and host device may, for example, be performed using the I2C diagnostic interface of the second transceiver 100a, or in any other convenient manner. Exemplary host devices may take the form of a host bus adapter or converged network adapter with firmware supporting reading of OTDR data and extended data communications from the transceiver device 100, for example using the I2C interface 640, or a switch or storage controller.

Figure 10:
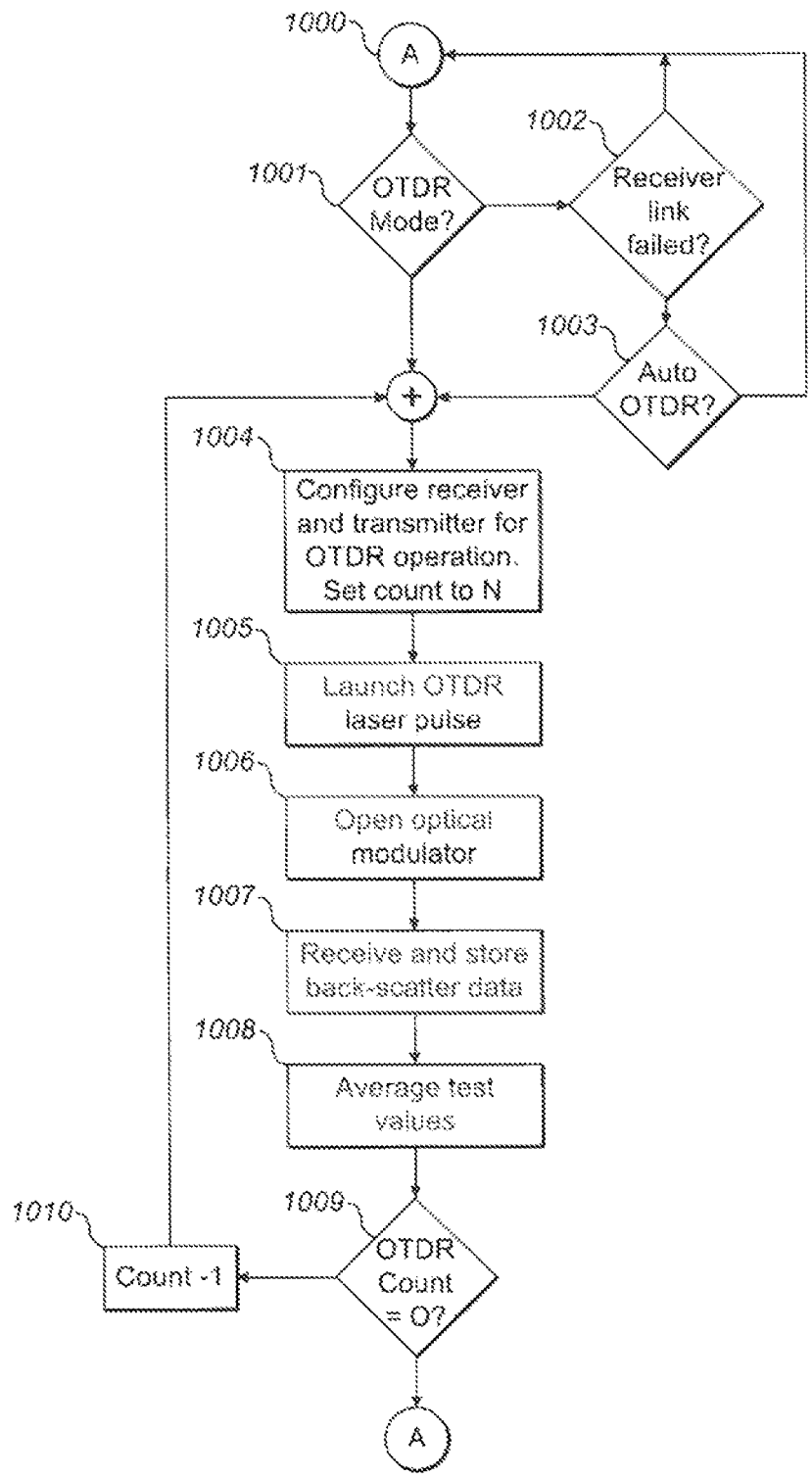
FIG. 10 is a further flow diagram illustrating a method of obtaining test data for an optical fibre.

FIG. 10 illustrates a method of operation embodied in the OTDR control logic 631, with respect to the optical data communications subsystem 800. Following initiation of the method (step 1000), the control logic 631 of transceiver 100a determines (step 1001) whether the OTDR mode condition has been established, for example in accordance with a predetermined periodic schedule or in response to a communication received through the communications interface 640. The OTDR mode condition can be established, for example by setting a bit in a predetermined location in memory, for example in EEPROM 641, to a predetermined state. If the OTDR mode condition has not been established, the OTDR control logic 631 determines in step 1002 whether the receiver link comprising external optical fiber 144 and the first transmitter arrangement 120b has failed, for example because no signal is presently detected at the photodetector 145a. If the receiver link 144, 120b has not failed, the control logic 631 returns to the start (step 1000) to re-initiate the routine. If a failure of the receiver link 144, 120b is determined, the control logic 631 proceeds to determine (step 1003) whether an auto-OTDR condition is set, for example by setting of a bit in a predetermined location in a memory of the circuitry 600 to a predetermined state. If the auto-OTDR condition is not set, the OTDR control logic 631 returns to the start 1000.

If the OTDR control logic 631 determines that the OTDR mode condition of the transceiver 100a is established, or that the auto-OTDR condition is set and the receiver link 144, 120b has failed, the OTDR control logic 631 proceeds to configure (step 1004) the receiver and transmitter arrangements 120a, 140a for OTDR operation, including setting an OTDR cycle count value to a predetermined start value N, using a predetermined location in a memory of the circuitry 600. In general, the predetermined count start value N is greater than 1, so that the results of multiple OTDR pulse cycles can be stored and averaged. In step 1005 the OTDR control logic 631 causes the second transmitter arrangement 120a to launch an OTDR laser pulse in the external fiber 124 to be tested. In step 1006 the optical modulator 170a is unshuttered, and in step 1007 the back-scatter from the OTDR test pulse is received by the photodetector 145a and stored by the OTDR control logic 631 in the OTDR memory 642. In step 1008, the stored test values are averaged, for example by calculating a walking average. The averaging can be performed, for example, by the controller logic 630 of the transceiver 100a, or can alternatively be performed by another device to which the stored OTDR test values have been communicated.

In step 1009, the OTDR control logic 631 determines whether the OTDR count has reached a predetermined stop value, for example whether the OTDR count has been reduced to 0. If the predetermined stop value has been reached, the OTDR control logic returns to the start condition 1000. If the predetermined stop value has not been reached, the OTDR control logic 631 adjusts the stored count value, for example by reducing the stored count value by 1 (step 1010) and returns to step 1004 to perform a further OTDR test cycle. It will be apparent that the sequential order of at least some of the steps above can be varied if desired. By averaging the OTDR test results over many OTDR cycles, the accuracy of OTDR readings can be increased.

At least some embodiments of the invention facilitate the provision of a relatively compact and relatively cheap optical transceiver that can automatically and remotely obtain OTDR data for characterising an optical subsystem, including for identifying the presence and/or location of fiber breaks, and/or that can be provided in conformity with certain optical transceiver standards, for example SFP-type specifications. At least some embodiments facilitate the avoidance of inconvenience and/or lengthy procedures for placing an optical line in shutdown mode prior to OTDR testing. Utilisation of photodetector capability already present in a transceiver without OTDR capability facilitates compactness and/or reduced cost embodiments.

What is claimed is:

1. An optical transceiver having a communications mode and an optical time domain reflectometer (OTDR) mode, the transceiver comprising:
   a transmitter arrangement and a receiver arrangement operable, in the communications mode, to respectively transmit and receive communications signals through respective external optical fibers; and
   a guide arrangement for guiding, in the OTDR mode, a reflected OTDR signal along a path from a transmitter channel in the transmitter arrangement into a receiver channel in the receiver arrangement,
   wherein the guide arrangement includes a first beam splitter in the transmitter channel configured to reflect the back-scatter laterally of a direction of a longitudinal axis of the transmitter channel towards a second beam splitter in the receiver channel configured to reflect the received back-scatter along a direction of a longitudinal axis of the receiver channel to an optical detector of the receiver channel,
   wherein the first beam splitter in the transmitter channel has mutually oppositely facing substantially planar adjacent faces extending laterally across the transmitter channel and disposed in a vertical plane at a first angle with respect to a longitudinal center axis A-A of the transmitter channel, and
   the second beam splitter in the receiver channel has mutually oppositely facing substantially planar adjacent faces extending laterally across the receiver channel and disposed in a vertical plane at a second angle with respect to a longitudinal center axis B-B of the transmitter channel.

2. The optical transceiver of claim 1, wherein the guide arrangement further comprises a light guide to guide the reflected back-scatter laterally between the transmitter channel and the receiver channel.

3. The optical transceiver of claim 1, including a shutter arrangement and having:
   an OTDR mode condition, in which the shutter arrangement permits propagation of the back-scatter along said path; and
   a communications mode condition, in which the shutter arrangement reduces or prevents signal propagation along said path.

4. The optical transceiver of claim 1, comprising an additional first beam splitter disposed in the transmitter channel, and an additional second beam splitter disposed in the receiver channel, the additional first and second beam splitters being disposed and configured to guide, in OTDR mode, a portion of a signal transmitted by the transmitter along a further path from the transmitter channel into the receiver channel to an optical detector of the receiver channel.

5. The optical transceiver of claim 1, the transceiver being removably pluggable into a host device circuit connection, and comprising on-board OTDR control circuitry to control transmission of OTDR signals and storage and communication of received OTDR information.

6. The optical transceiver of claim 1, operable to cause a counterpart optical transceiver couplable to opposite ends of the external optical fibers to stop transmission of communications signals to the receiver channel, for facilitating detection of the back-scatter.

7. The optical transceiver of claim 1, operable to communicate with a counterpart optical transceiver couplable to an opposite end of the external optical fibers using transmitter channel sideband communications, to stop transmission of communications signals to the receiver channel.

8. A method of obtaining test data for an optical fiber in an optical data communications subsystem, the subsystem comprising a first transceiver having a first transmitter arrangement and a first receiver arrangement connected by respective optical fibers to a second receiver arrangement and second transmitter arrangement of a second transceiver, and respective beam splitters in a transmitter channel and a receiver channel, the method comprising:
   temporarily interrupting operational signal transmission through the first transmitter arrangement;
   transmitting a predetermined test signal in the second transmitter arrangement to generate back-scatter in the optical fiber to be tested; and
   receiving the back-scatter at a detector of the second receiver arrangement,
   wherein a first beam splitter in the transmitter channel has mutually oppositely facing substantially planar adjacent faces extending laterally across the transmitter channel and disposed in a vertical plane at a first angle with respect to a longitudinal center axis A-A of the transmitter channel, and a second beam splitter in the receiver channel has mutually oppositely facing substantially planar adjacent faces extending laterally across the receiver channel and disposed in a vertical plane at a second angle with respect to a longitudinal center axis B-B of the transmitter channel.

9. The method of claim 8, wherein the subsystem further comprises respective beam splitters in the second transmitter arrangement and the second receiver arrangement to reflect the back-scatter along a path between the second transmitter arrangement and the detector of the second receiver arrangement, and a shutter for shuttering light at least at normal transmission wavelengths of the second transmitter arrangement, the method further comprising shuttering the path to signals from the first transmitter arrangement during operational signal transmission.

10. The method of claim 8, wherein the second transceiver communicates using a sideband through the second transmitter arrangement and the first receiver arrangement to cause the first transceiver to interrupt the first transmitter arrangement.

11. The method of claim 9, wherein the second transceiver uses a diagnostic interface to communicate through a network to a diagnostic interface of the first transceiver to interrupt the first transmitter arrangement.

12. The method of claim 9, further comprising converting the received back-scatter to electronic signals, and storing the signal data on the second transceiver.

13. The method of claim 9, comprising preventing passage of reflected radiation between the second transceiver arrangement and the second receiver arrangement during normal operational signalling, and permitting passage of back-scatter radiation between the second transceiver arrangement and the second receiver arrangement during testing of the optical fiber.

14. An SFP-type fiber optic transceiver comprising:
a transmitter arrangement including a transmitter channel; and
a receiver arrangement including a receiver channel and a detector configured to detect optical signals received through an external optical fiber couplable to the receiver channel;
the transmitter and receiver channels comprising respective beam splitters a first beam splitter in the transmitter arrangement and a second beam splitter in the receiver arrangement, configured to direct back-scattered radiation along a path from a further external optical fiber couplable to the transmitter channel, through respective portions of the transmitter channel and the receiver channel, to the detector,
wherein a first beam splitter in the transmitter channel has mutually oppositely facing substantially planar adjacent faces extending laterally across the transmitter channel and disposed in a vertical plane at a first angle with respect to a longitudinal center axis A-A of the transmitter channel, and
a second beam splitter in the receiver channel has mutually oppositely facing substantially planar adjacent faces extending laterally across the receiver channel and disposed in a vertical plane at a second angle with respect to a longitudinal center axis B-B of the transmitter channel.

15. The SFP-type fiber optic transceiver of claim 14, further comprising an OTDR control circuit, and a liquid crystal light valve controllable by the OTDR control circuit to open or shutter the path into the receiver channel.

16. The optical transceiver of claim 1, wherein the beam splitter in the transmitter channel permits passage of a proportion of the energy of an incoming signal, wherein the proportion of the incoming signal is reflected from a signal path by the beam splitter and dispersed.

17. The optical transceiver of claim 1, wherein the second angle is selected to reflect a proportion of the back-scatter received from a lateral guide channel along a path to the optical detector of the receiver channel.

18. The optical transceiver of claim 1, further comprising a coating on the first beam splitter in the transmitter channel and another coating on the second beam splitter in the receiver channel, the coating and the another coating providing transmission characteristics through the first and second beam splitters.

* * * * *

UNITED STATES PATENT AND TRADEMARK OFFICE
CERTIFICATE OF CORRECTION

| | | |
|---|---|---|
| PATENT NO. | : 9,036,991 B2 | Page 1 of 1 |
| APPLICATION NO. | : 13/259833 | |
| DATED | : May 19, 2015 | |
| INVENTOR(S) | : Jerry G. Aguren | |

It is certified that error appears in the above-identified patent and that said Letters Patent is hereby corrected as shown below:

On the title page item (54), and in the specification, column 1, lines 1-4, in the title, delete "OPTICAL TRANSCEIVER HAVING AN OTDR MODE, AND A METHOD OF OBTAINING TEST DATA FOR TESTING AN OPTICAL FIBER" and insert -- TRANSMITTER AND RECEIVER ARRANGEMENTS FOR TESTING AN OPTICAL FIBER --, therefor.

Signed and Sealed this
Fifteenth Day of December, 2015

Michelle K. Lee
*Director of the United States Patent and Trademark Office*